United States Patent
Flenniken et al.

(10) Patent No.: US 10,654,996 B2
(45) Date of Patent: May 19, 2020

(54) METHODS OF CROSSLINKING AND COMPOSITIONS

(71) Applicant: EQUISTAR CHEMICALS, LP, Houston, TX (US)

(72) Inventors: Cindy L. Flenniken, Clarksville, OH (US); Chun D. Lee, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 48 days.

(21) Appl. No.: 15/993,118

(22) Filed: May 30, 2018

(65) Prior Publication Data

US 2018/0346698 A1 Dec. 6, 2018

Related U.S. Application Data

(60) Provisional application No. 62/513,021, filed on May 31, 2017, provisional application No. 62/534,037, filed on Jul. 18, 2017.

(51) Int. Cl.
| | |
|---|---|
| *C08L 23/04* | (2006.01) |
| *C08L 23/06* | (2006.01) |
| *C08J 3/24* | (2006.01) |
| *C08K 5/14* | (2006.01) |
| *C08K 5/5419* | (2006.01) |
| *C08L 23/14* | (2006.01) |

(52) U.S. Cl.
CPC ............... *C08L 23/06* (2013.01); *C08J 3/242* (2013.01); *C08K 5/14* (2013.01); *C08K 5/5419* (2013.01); *C08L 23/04* (2013.01); *C08L 23/14* (2013.01); *C08J 2323/08* (2013.01); *C08J 2423/06* (2013.01); *C08L 2205/02* (2013.01); *C08L 2205/025* (2013.01); *C08L 2207/062* (2013.01); *C08L 2207/066* (2013.01); *C08L 2312/08* (2013.01); *C08L 2314/02* (2013.01)

(58) Field of Classification Search
CPC .... C08J 3/242; C08J 2323/08; C08J 2423/06; C08L 23/04; C08L 23/14; C08L 23/06; C08L 2207/062; C08L 2205/025; C08L 2205/02; C08L 2312/08; C08L 2207/066; C08L 2314/02; C08L 2023/44; C08K 5/14; C08K 5/5419; C08K 5/5425
See application file for complete search history.

(56) References Cited

U.S. PATENT DOCUMENTS

| | | | | |
|---|---|---|---|---|
| 5,112,918 A | * | 5/1992 | Boocock et al. | C08J 3/226 264/211.24 |
| 2004/0019155 A1 | * | 1/2004 | McLeod et al. | C08F 10/02 525/333.8 |
| 2006/0178487 A1 | | 8/2006 | Weller | |
| 2006/0258796 A1 | | 11/2006 | Boogh et al. | |
| 2012/0172510 A1 | | 7/2012 | Esseghir et al. | |
| 2016/0303711 A1 | * | 10/2016 | Kasai et al. | B24D 11/001 |
| 2017/0342191 A1 | * | 11/2017 | Osakabe et al. | C09C 3/08 |

FOREIGN PATENT DOCUMENTS

EP      0416851 A2    3/1991

OTHER PUBLICATIONS

International Search Report and Written Opinion dated Sep. 7, 2018 (Sep. 7, 2018) for Corresponding PCT/US2018/035148.

\* cited by examiner

*Primary Examiner* — Nathan M Nutter

(57) ABSTRACT

The present disclosure provides a method for crosslinking polyolefins through using a substantially-miscible, polyolefin-based, silane-crosslinking-agent carrier and related moisture-crosslinkable polyolefin-based compositions. The method is for crosslinking a first polyolefin includes the steps of:

(A) selecting a second polyolefin being substantially-miscible with the first polyolefin and having particles of a morphology selected from the group consisting of powder and substantially spherical;
(B) admixing the second polyolefin to the first polyolefin;
(C) adsorbing a silane-crosslinking agent onto the second polyolefin, thereby rendering a substantially-miscible, polyolefin-based, silane-crosslinking-agent carrier;
(D) melt blending the first polyolefin and the substantially-miscible, polyolefin-based, silane-crosslinking-agent carrier, thereby yielding a moisture-crosslinkable polyolefin-based composition; and
(E) crosslinking the moisture-crosslinkable polyolefin-based composition.

14 Claims, 2 Drawing Sheets

_US 10,654,996 B2_

METHODS OF CROSSLINKING AND COMPOSITIONS

CROSS-REFERENCE TO RELATED APPLICATIONS

This application is the Non-Provisional patent application, which claims benefit of priority to U.S. Provisional Application No. 62/513,021, filed May 31, 2017 and U.S. Provisional Application No. 62/534,037, filed Jul. 18, 2017, the contents of which are incorporated herein by reference in their entirety.

FIELD OF THE INVENTION

In general, the present disclosure relates to the field of chemistry. More specifically, the present disclosure relates to methods for crosslinking polyolefins and related moisture-crosslinkable polyolefin-based compositions. In particular, the present disclosure relates to a method for crosslinking polyolefins through using a substantially-miscible, polyolefin-based, silane-crosslinking-agent carrier and related moisture-crosslinkable polyolefin-based compositions.

BACKGROUND OF THE INVENTION

Crosslinking of polyolefins can improve the physical properties of articles made therefrom. Moisture-crosslinking is useful for wire-and-cable and crosslinked polyethylene ("PEX") tubing applications.

For some applications, a liquid, crosslinking-agent "cocktail" is injected or sprayed into the feed section of an extruder, along with pellets of a polyolefin-based product. In some instances, the polyolefin-based product is a base resin, an insulation composition, or a jacket composition. While one of the goals is to adhere the crosslinking-agent cocktail to the pellets, some of the cocktail unfortunately coats part of the extruder.

When the cocktail adheres to part of the extruder, the cocktail may cause slippage of the material along the screw or barrel of the extruder, variation in the volume fed along the screw, flucuations in wall thickness, or unused residue of cocktail in the feed section or on the barrel. To compensate for the unused residue, an additional amount of cocktail is used to permit complete crosslinking. Incomplete crosslinking can adversely effect gel content as well as physical properties such as tensile strength, elongation, hot creep, hot set, and glancing impact. In some instances, the unused residue can harm components of the extruder.

Better incorporation of the liquid, crosslinking-agent cocktail would improve gel content and physical properties of the moisture-cured articles, reduce the amount of cocktail used to compensate for residue losses, and minimize the risk of harm to components of the extruder.

BRIEF SUMMARY OF THE INVENTION

In general embodiments, the present disclosure provides a method for crosslinking a first polyolefin including the steps of:
  (A) selecting a second polyolefin being substantially-miscible with the first polyolefin and having particles of a morphology selected from the group consisting of powder and substantially spherical;
  (B) admixing the second polyolefin to the first polyolefin;
  (C) adsorbing a silane-crosslinking agent onto the second polyolefin, thereby rendering a substantially-miscible, polyolefin-based, silane-crosslinking-agent carrier;
  (D) melt blending the first polyolefin and the substantially-miscible, polyolefin-based, silane-crosslinking-agent carrier, thereby yielding a moisture-crosslinkable polyolefin-based composition; and
  (E) crosslinking the moisture-crosslinkable polyolefin-based composition.

In general embodiments, the present disclosure provides a moisture-crosslinkable polyolefin-based composition made from or containing:
  (I) a melt-blended composition made from or containing
    (A) a first polyolefin being a pelletized polyolefin;
    (B) a second polyolefin being substantially miscible with the first polyolefin and having particles of a morphology selected from the group consisting of powder and substantially spherical; and
    (C) a silane-crosslinking agent made from or containing (i) a silane, (ii) a peroxide, (iii) optionally, a catalyst, and (iv) optionally, additives, and being adsorbed onto the second polyolefin.

In general embodiments, the present disclosure provides a moisture-cured polyolefin-based article made from or containing:
  (I) a melt-blended composition made from or containing
    (A) a first polyolefin being a pelletized polyolefin;
    (B) a second polyolefin being substantially miscible with the first polyolefin and having particles of a morphology selected from the group consisting of powder and substantially spherical; and
    (C) a silane-crosslinking agent made from or containing (i) a silane, (ii) a peroxide, (iii) optionally, a catalyst, and (iv) optionally, additives, and being adsorbed onto the second polyolefin.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

BRIEF DESCRIPTION OF THE SEVERAL VIEWS OF THE DRAWINGS

The following figures illustrate preferred embodiments of the subject matter disclosed herein. The claimed subject matter may be understood by reference to the following description taken in conjunction with the accompanying figures, in which like reference numerals identify like elements, and in which:

DETAILED DESCRIPTION OF THE INVENTION

Figure 1:
FIG. 1 is an image of a vertical feed hopper, from above, following introduction of pellets of a polyolefin-based product and an amount of liquid, crosslinking-agent cocktail into the hopper.

The present invention now will be described more fully hereinafter. However, this invention can be embodied in many different forms and should not be construed as limited to the embodiments set forth herein; rather, these embodiments are provided so that this disclosure will satisfy applicable legal requirements. As such, it will be apparent to those skilled in the art that the embodiments can incorporate changes and modifications without departing from the general scope. It is intended to include all the modifications and alterations in so far as the modifications and alterations come within the scope of the appended claims or the equivalents thereof.

As used in this specification and the claims, the singular forms "a," "an," and "the" include plural referents unless the context clearly dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a means for identifying discrete activities or ingredients and the recited lettering can be arranged in any sequence, unless expressly indicated.

For the purpose of the present description and of the claims which follow, except where otherwise indicated, numbers expressing amounts, quantities, percentages, and so forth, are to be understood as being modified by the term "about". Also, ranges include any combination of the maximum and minimum points disclosed and include any intermediate ranges therein, which may or may not be specifically enumerated herein.

Definitions

In the present description, the term "first" refers to the order in which a particular species is presented and does not necessarily indicate that a "second" species will be presented. For example, "first polymer composition" refers to the first of at least one polymer composition. The term does not reflect priority, importance, or significance in any other way. Similar terms used that can be used herein include "second," "third," "fourth," etc.

In the present description, the term "high density polyethylene" refers to ethylene based polymers having a density of from about 0.94 to about 0.97 g/cm$^3$.

In the present description, the term "low density polyethylene" refers to ethylene based polymers having a density in a range of 0.88 to 0.925 g/cm$^3$. In the present description, the term "linear low density polyethylene" refers to substantially linear low density polyethylene characterized by the absence of long chain branching.

In the present description, the term "medium density polyethylene" refers to ethylene based polymers having a density of from 0.92 to 0.94 g/cm$^3$.

In the present description, the term "miscible" means the property of a first substance to mix in all proportions into a second substance, forming a homogeneous solution. The term "substantially miscible" encompasses the property of the first substance mixing in the second substance in concentrations up to at least about 30 weight percent, based upon the total weight of the solution, alternatively, up to at least about 20 wt %, alternatively, up to at least about 10 wt %, alternatively, up to at least about 5 wt %.

In the present description, the term "polymer" means a macromolecular compound prepared by polymerizing monomers of the same or different type. The term "polymer" includes homopolymers, copolymers, terpolymers, interpolymers, and so on.

In the present description, the term "polymer composition" refers to a composition made from or containing at least one polymer.

In the present description, the term "polyolefin" is used herein broadly to include polymers such as polyethylene, ethylene-alpha olefin copolymers (EAO), polypropylene, polybutene, and ethylene copolymers having at least about 50 percent by weight of ethylene polymerized with a lesser amount of a comonomer such as vinyl acetate, and other polymeric resins within the "olefin" family classification.

Polyolefins can be made by a variety of processes including batch and continuous processes using single, staged, or sequential reactors, slurry, solution, and fluidized bed processes and one or more catalysts including for example, heterogeneous and homogeneous systems and Ziegler, Phillips, metallocene, single-site, and constrained geometry catalysts to produce polymers having different combinations of properties.

In the present description, the term "powder" or the term "reactor powder" refers to a polyolefin having a nominal mesh size of 35 (nominal diameter of 500 micron), having not been subjected to a post-reactor pelletizing process, and having a bulk density lower than that of pellets. While the term "powder" is applicable to materials having an average diameter of about 20 microns, those materials are classified as a "nuisance dust" and may pose an increased risk of flammability.

In the present description, the term "substantially spherical morphology" refers to particles having the ratio between the greater axis and the smaller axis equal to or lower than about 1.5, alternatively lower than about 1.3.

In the present description, the term "thermoplastic polymer" means a polymer that softens when exposed to heat and returns to its original condition when cooled to room temperature.

In the present description, the term "Ziegler-Natta-catalyzed linear low density polyethylene composition" refers to a composition made from or containing at least one Ziegler-Natta-catalyzed linear low density polyethylene.

In the present description, the terms "Ziegler-Natta-catalyzed polymer" and "Z-N-catalyzed polymer" mean any polymer that is made in the presence of a Ziegler-Natta catalyst.

Testing

ASTM D 638 is entitled "Standard Test Method for Tensile Properties of Plastics." The term "ASTM D 638" as used herein refers to the test method designed to produce tensile property data for the control and specification of plastic materials. This test method covers the determination of the tensile properties of unreinforced and reinforced plastics in the form of standard dumbbell-shaped test specimens when tested under defined conditions of pretreatment, temperature, humidity, and testing machine speed. This test method can be used for testing materials of any thickness up to 14 mm (0.55 in.). This test method was approved in 2010, the contents of which are incorporated herein by reference in its entirety.

ASTM D 1238 is entitled "Test Method for Melt Flow Rates of Thermoplastics by Extrusion Plastometer." The term "ASTM D 1238" as used herein refers to a test method covering the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety.

Throughout the present description and claims, the standard melt index values of polyethylene polymers are measured according to ASTM D 1238, using a piston load of 2.16 kg and at a temperature of 190 degrees Celsius. The High Load Melt Index (or HLMI) values are also measured according to ASTM D 1238, but using a piston load of 21.6 kg and at a temperature of 190 degrees Celsius.

Throughout the present description and claims, the standard melt flow rate values of polypropylene polymers are measured according to ASTM D 1238, using a piston load of 2.16 kg and at a temperature of 230 degrees Celsius.

ASTM D 1248 is entitled "Specifications for Polyethylene Materials for Wire and Cable." The term "ASTM D 1248" as used herein refers to the standard for identification of polyethylene plastics extrusion materials for wire and cable. Identification primarily focuses on two basic characteristics, density and flow rate. The ASTM D 1248 standard refers the reader to multiple ASTM standards for cell type classification. These test standards cover equipment requirements, sample preparation and methods for determination of various properties required for wire and cable compounds. This test method was published Apr. 1, 2012, the contents of which are incorporated herein by reference in its entirety.

ASTM D 1505 is entitled "Standard Test Method for Density of Plastics by the Density-Gradient Technique." The term "ASTM D 1505" as used herein refers to a test method based on observing the level to which a test specimen sinks in a liquid column exhibiting a density gradient, in comparison with standards of known density. This test method was approved on Jul. 1, 2010 and published September 2010, the contents of which are incorporated herein by reference in its entirety.

ISO 1133 is entitled "Plastics—Determination of the Melt Mass-Flow Rate (MFR) and the Melt Volume-Flow Rate (MVR) of Thermoplastics." The term "ISO 1133" as used herein refers to the test method for the determination of the melt mass-flow rate (MFR) and the melt volume-flow rate (MVR) by extruding molten material from the barrel of a plastometer under preset conditions of temperature and load.

ISO 1183 is entitled "Methods for Determining the Density of Non-Cellular Plastics." The term "ISO 1183" as used herein refers to the test method for the determination of the density of non-cellular molded or extruded plastics in void-free form. In this gradient column method, density gradient columns are columns containing a mixture of two liquids, the density in the column increasing uniformly from top to bottom.

The term "UL 44/UL 2556" as used herein refers to the standard detailing the performance requirements and test methods for thermoset-insulated wire and cables. The UL 44 standard refers the reader to UL 2556 for the specific wire and cable test methods. In general, these test standards cover the requirements and methods for determination of electrical, mechanical, and flame characteristics testing. UL 44 (published Sep. 10, 2010) and UL 2556 (published on Mar. 22, 2013) are incorporated herein by reference in its entirety. For the referenced UL standards, visit the IHS website, http://www.global.ihs.com/or contact IHS Customer Service at Email: global@ihs.com.

In general embodiments, the present disclosure provides a method for crosslinking a first polyolefin including the steps of:
(A) selecting a second polyolefin being substantially-miscible with the first polyolefin and having particles of a morphology selected from the group consisting of powder and substantially spherical;
(B) admixing the second polyolefin to the first polyolefin;
(C) adsorbing a silane-crosslinking agent onto the second polyolefin, thereby rendering a substantially-miscible, polyolefin-based, silane-crosslinking-agent carrier;
(D) melt blending the first polyolefin and the substantially-miscible, polyolefin-based, silane-crosslinking-agent carrier, thereby yielding a moisture-crosslinkable polyolefin-based composition; and
(E) crosslinking the moisture-crosslinkable polyolefin-based composition.

In some embodiments, the first polyolefin is a peroxide-modified polyolefin. In some of those embodiments, the polyolefin is selected from the group consisting of polyethylene, ethylene-alpha olefin copolymers (EAO), polypropylene, polybutene, and ethylene copolymers having at least about 50 percent by weight of ethylene polymerized with a lesser amount of a comonomer such as vinyl acetate. In some embodiments, the polyolefin is a Ziegler-Natta-catalyzed polyethylene having an original melt index of from about 0.5 to about 20. In other embodiments, the melt index is from about 0.5 to 10. In yet other embodiments, the melt index is 0.5, 1, 2, 3, 4, 5, 6, 7, 8, 9, 10, or an intermediate melt index.

In some embodiments, the Ziegler-Natta-catalyzed polyethylene is a linear low density polyethylene, a medium density polyethylene, or a high density polyethylene.

In some embodiments, the peroxide-modified polyolefin is a linear low density polyethylene, having a melt index of about 0.85 g/10 min (measured by ASTM D1238, at 190° C. and 2.16 kg) and a density of about 0.919 g/cm$^3$ (measured by ASTM D1505).

In some embodiments and when the first polyolefin is a peroxide-modified polyolefin, the polyolefin is a combination of polyolefins coupled by the peroxide wherein the polyolefins are selected from the group consisting of polyethylene, ethylene-alpha olefin copolymers (EAO), polypropylene, polybutene, and ethylene copolymers having at least about 50 percent by weight of ethylene polymerized with a lesser amount of a comonomer such as vinyl acetate. In these embodiments, the peroxide-modified polyolefin is a coupled polyolefin. In some embodiments, the combination is a first Ziegler-Natta-catalyzed polyethylene and a polyolefin selected from the group consisting of a high density polyethylene and a second Ziegler-Natta-catalyzed polyethylene. In some embodiments, the second Ziegler-Natta-catalyzed polyethylene has a melt index different from the first Ziegler-Natta-catalyzed polyethylene.

In some embodiments, the peroxide for modifying the polyolefin is an organic peroxide added in an amount less than about 2000 ppm. In other embodiments, the organic peroxide is added in an amount less than about 1500 ppm. In yet other embodiments, the organic peroxide is added in an amount in the range of about 100 ppm to about 700 ppm.

In further embodiments, the organic peroxide is added in an amount of about 100, 200, 300, 400, 500, 600, 700 ppm, or an intermediate amount.

In some embodiments, the first polyolefin is a pelletized polyolefin. In some of those embodiments, the pelletized polyolefin is selected from the group consisting of polyethylene, ethylene-alpha olefin copolymers (EAO), polypropylene, polybutene, and ethylene copolymers having at least about 50 percent by weight of ethylene polymerized with a lesser amount of a comonomer such as vinyl acetate. In some embodiments, the pelletized polyolefin is selected from the group consisting of polyethylene and polypropylene.

In some embodiments, the second polyolefin is selected from the group consisting of polyethylene, ethylene-alpha olefin copolymers (EAO), polypropylene, polybutene, and ethylene copolymers having at least about 50 percent by weight of ethylene polymerized with a lesser amount of a comonomer such as vinyl acetate.

In some embodiments, the second polyolefin is a powder having an average particle size of about 100 μm to about 1,000 μm, alternatively about 100 μm to about 900 μm, alternatively about 200 μm to about 700 μm, alternatively about 500 μm. In some embodiments, the powder has an average particle size of about 200, 300, 400, 500, 600, 700 μm, or an intermediate particle size. In some embodiments, the powder contains irregularly-shaped particles or regularly-shaped particles.

In some embodiments, the second polyolefin is a powder selected from the group consisting of high density polyethylene (HDPE), low density polyethylene (LDPE), and linear low density polyethylene (LLDPE). In some embodiments, the second polyolefin is a high density polyethylene reactor powder, having a melt index of 1.14 g/10 min (ASTM D1238, at 190° C., 2.16 kg), a density of 0.948 g/cm$^3$ (ASTM D1505), an irregular shape, and an average particle size of 35 mesh.

In some embodiments, the second polyolefin contains substantially spherical particles having an average diameter of about 0.5 mm to about 15 mm, alternatively about 1 mm to about 10 mm, alternatively about 2 mm to about 7 mm, alternatively about 3 mm. In some embodiments, the substantially-spherical particles have an average diameter of about 1, 2, 3, 4, 5, 6, 7 mm, or an intermediate diameter. In some embodiments, the substantially-spherical particles have porosity. In some embodiments, the second polyolefin is a substantially spherical polypropylene reactor sphere.

In some embodiments, the second polyolefin contains substantially spherical particles and has a melt flow rate of from about 1 to about 30. In other embodiments, the melt flow rate is from about 1 to 20. In yet other embodiments, the melt flow rate is 1, 5, 10, 15, 20, or an intermediate melt flow rate.

In some embodiments, the second polyolefin contains substantially spherical particles, is a polypropylene random copolymer, has a density of about 0.9 g/cm (ISO 1183), and has a melt flow rate of about 20 g/10 min (ISO 1133, 230° C./2.16 g). In some embodiments, the second polyolefin contains substantially spherical particles, is polypropylene random copolymer, has a density of about 0.9 g/cm (ISO 1183), and has a melt flow rate of about 5 g/10 min (ISO 1133, 230° C./2.16 g).

In some embodiments, the second polyolefin is added in amount within the range of about 0.1 to about 25 weight percent, based upon the total weight of the polyolefin composition made from or containing the first polyolefin and the second polyolefin. In some embodiments, the range is from about 0.5 to about 20 weight percent, alternatively, from about 1 to about 15 weight percent. In some embodiments, the second polyolefin is added in an amount of 1, 2, 3, 4, 5, 6, 7, 8, 9, 10, 11, 12, 13, 14, 15, or an intermediate weight percent.

In some embodiments, the silane-crosslinking agent is added in amount within the range of about 0.1 to about 10 weight percent, based upon the total weight of the polyolefin composition made from or containing the first polyolefin and the second polyolefin. In some embodiments, the silane-crosslinking agent is added in amount within the range from about 0.1 to about 5 weight percent. In some embodiments, the amount is 0.1, 0.5, 1, 2, 3, 4, 5, or an intermediate weight percent.

In some embodiments, the silane-crosslinking agent is made from or contains (i) a silane, (ii) a peroxide, (iii) optionally, a catalyst, and (iv) optionally, additives. In some embodiments, the silane is present in an amount of about 10 to about 99 weight percent, based upon the total weight of the silane-crosslinking agent. In some embodiments, the peroxide is present in an amount of about 1 to about 15 weight, based upon the total weight of the silane-crosslinking agent. In some embodiments, the catalyst is present in an amount of about 1 to about 15 percent, based upon the total weight of the silane-crosslinking agent. In some embodiments, the additives are present in an amount of about 0.01 to about 5.0 percent, based upon the total weight of the silane-crosslinking agent.

In some embodiments, the silane is a trialkoxyvinyl silane. In some embodiments, the trialkoxyvinyl silane is a trimethoxyvinyl silane.

In some embodiments, the peroxide is a bis-(alkyl-aryl) peroxide. In some embodiments, the bis-(alkyl-aryl) peroxide is dicumyl peroxide.

In some embodiments, the catalyst is selected from the group consisting of dibutyl tin dilaurate and a hydrophobic acid catalyst. In some embodiments, the hydrophobic acid catalyst is a sulfonic acid catalyst.

In some embodiments, the additive is made from or contains a silicate. In some embodiments, the silicate is tetramethyl orthosilicate.

In some embodiments, the process steps occur continuously or in a batch. In the continuous process, the first polyolefin and the second polyolefin are jointly or sequentially fed into a mixer. The silane-crosslinking agent can be fed jointly with the polyolefins or sequentially. During the feeding of the silane-crosslinking agent, the agent was adsorbed onto the second polyolefin. In a batch process, the first polyolefin and the second polyolefin were pre-mixed, with the silane-crosslinking agent added sequentially.

In some embodiments, the melt-blending step occurs in an extruder or other heated mixer. In some embodiments, the melt-blending step is followed by an optional pelletizing step.

In some embodiments, the crosslinking steps occurs inline with the melt-blending step. In some embodiments, the pellets produced by the optional pelletizing steps are subsequently melt-formed into an article or melt-applied to a substrate followed by the crosslinking.

In general embodiments, the present disclosure provides a moisture-crosslinkable polyolefin-based composition made from or containing:
(I) a melt-blended composition made from or containing
(A) a first polyolefin being a pelletized polyolefin;
(B) a second polyolefin being substantially miscible with the first polyolefin and having particles of a morphology selected from the group consisting of powder and substantially spherical; and (C) a silane-crosslinking agent made from or containing (i) a silane, (ii) a peroxide, (iii) optionally, a catalyst, and (iv) optionally, additives, and being adsorbed onto the second polyolefin.

In general embodiments, the present disclosure provides a moisture-cured polyolefin-based article made from or containing:

(I) a melt-blended composition made from or containing
(A) a first polyolefin being a pelletized polyolefin;
(B) a second polyolefin being substantially miscible with the first polyolefin and having particles of a morphology selected from the group consisting of powder and substantially spherical; and
(C) a silane-crosslinking agent made from or containing (i) a silane, (ii) a peroxide, (iii) optionally, a catalyst, and (iv) optionally, additives, and being adsorbed onto the second polyolefin.

In some embodiments, the moisture-cured polyolefin-based article is an insulated electrical cable having (a) an electrically conductive core and (b) a semiconductive shield containing a semiconductive shield composition made from or containing the melt-blended composition. In some embodiments, the moisture-cured polyolefin-based article is carpet having a carpet backing made from or containing the melt-blended composition. In some embodiments, the moisture-cured polyolefin-based article is crosslinked polyethylene tubing made from or containing the melt-blended composition.

For purposes of this disclosure, a "comparative polyolefin-based article" is described as an article prepared according to the same conditions as an article of the present disclosure, in the absence of the second polyolefin. In some embodiments, the gel content of the moisture-cured polyolefin-based article exceeds the gel content of the comparative polyolefin-based article in an amount between about 15 to about 25 percent, alternatively between about 20 to about 25 percent. In some embodiments, the Glancing Impact (measured according to UL 44/UL 2556) of the moisture-cured polyolefin-based article exceeds the Glancing Impact of the comparative polyolefin-based article in an amount between about 50 to about 150 percent, alternatively, between about 100 to about 150 percent, alternatively about 120 to about 130 percent. In some embodiments, the hot creep (measured according to UL 44/UL 2556) of the moisture-cured polyolefin-based article is lower than the hot creep of the comparative polyolefin-based article in an amount between about 35 to about 55 percent, alternatively, between about 40 to about 50 percent, alternatively about 43 to about 46 percent.

In some embodiments, the moisture-cured polyolefin-based article has a Glancing Impact (measured according to UL 44/UL 2556) greater than about 28% Retained Breakdown Voltage.

In some embodiments, the moisture-cured polyolefin-based article has a Hot Creep (measured according to UL 44/UL 2556) less than about 55%, alternatively between 10% and 55%, alternatively between 20% and 50%.

EXAMPLES

The following examples are included to demonstrate embodiments. It should be appreciated by those of skill in the art that the techniques disclosed in the examples which follow represent techniques discovered to function well, and thus can be considered to constitute exemplary modes of practice. However, those of skill in the art should, in light of the present disclosure, appreciate that many changes can be made in the specific embodiments which are disclosed and still obtain a like or similar result without departing from the spirit and scope of this disclosure.

Three samples of a cross-linked material were prepared. The first polyolefin for the samples was a pelletized, Ziegler-Natta linear low density polyethylene resin, having a melt index of 0.85 g/10 min (ASTM D1238, at 190° C., 2.16 kg) and a density of 0.919 g/cm$^3$ (ASTM D1505). The second polyolefin was a high density polyethylene reactor powder, having a melt index of 1.14 g/10 min (ASTM D1238, at 190° C., 2.16 kg), a density of 0.948 g/cm$^3$ (ASTM D1505), an irregular shape, and an average particle size of 35 mesh. The silane-crosslinking agent was DYNASYLAN™ SILFIN 75 crosslinking agent, having a density at 20° C. of 0.98 g/cm$^3$ and a viscosity at 20° C. of 0.8 mPas.

For comparative example (Comparative Ex. 1), the first polyolefin and the crosslinking agent were combined and then introduced to a feed hopper. The pellets were observed sticking to the walls of the feed hopper. Some of the crosslinking agent was left on the walls of the feed hopper. See FIG. 1.

Figure 2:
FIG. 2 is an image of the vertical feed hopper, from above, following introduction of pellets of a polyolefin-based product, a second polyolefin being substantially-miscible with the pellets of the polyolefin-based product and having particles of a powder morphology, and an amount of liquid, crosslinking-agent cocktail into the hopper.

For Examples 2 and 3, the first polyolefin and the second polyolefin powder were combined. Then, the crosslinking agent was added. The three components were introduced to a feed hopper. The pellets did not stick to the walls of the feed hopper. See FIG. 2.

For the comparative examples and the examples of an embodiment, various compounds were formulated to prepare test specimens. The materials were admixed in the weight percents shown in Table 1. The extrudeer had a conductor preheat of 200° F., a line speed of 200 fpm, and a screw speed was 45 rpm. For the individual samples, the head pressure, extruder power, cable diameters, and physical properties are also shown in Table 1.

Gel content was determined by ASTM D2765. Tensile and elongation properties were determined by ASTM D638. Glancing impact, hot creep, hot set, and deformation were determined by UL 44/UL 2556.

TABLE 1

| Component | Comparative Ex. 1 | Example 2 | Example 3 |
|---|---|---|---|
| 1$^{st}$ Polyolefin, wt % | 98.5 | 93.5 | 93.5 |
| 2$^{nd}$ Polyolefin, wt % | 0 | 5.0 | 5.0 |
| Silane Crosslinking Agent, wt % | 1.5 | 1.5 | 1.5 |
| Extruder Conditions | | | |
| Head Pressure, psi | 3426 | 3457 | 3540 |
| Extruder, amps | 32 | 33 | 34 |
| Cable Diameter, mils | 128.9 | 130.5 | 128.2 |
| Physical Properties | | | |
| Gel Content | 53.4 | 64.8 | 64.9 |
| Glancing Impact, % Ret. Breakdown Voltage | 27.3 | 61.4 | 61.5 |
| Hot Creep, % | 56.25 | 31.25 | 31.25 |
| Hot Set, % | 3.13 | 3.13 | 0 |
| Deformation, % (500 g, 131° C.) | 28 | 17.5 | 15.1 |
| Initial Tensile @ yield, psi | 1770 | 1680 | 1660 |
| Initial Tensile @ break, psi | 3380 | 2810 | 2820 |
| Initial Elongation, % | 690 | 480 | 490 |
| Aged 7 days @ 121 C. | | | |
| Aged Tensile, psi | 3960 | 3230 | 3320 |
| Aged Elongation, psi | 850 | 560 | 590 |

TABLE 1-continued

| Component | Comparative Ex. 1 | Example 2 | Example 3 |
|---|---|---|---|
| % Ret Tensile | 124 | 114 | 108 |
| % Ret Elongation | 152 | 117 | 113 |

It should be understood that various changes, substitutions and alterations can be made herein without departing from the spirit and scope of this disclosure as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

What is claimed is:

1. A method for crosslinking a first polyolefin comprising the steps of:
   (A) selecting a second polyolefin being substantially-miscible with the first polyolefin and having particles of a morphology selected from the group consisting of powder and substantially spherical;
   (B) admixing the second polyolefin to the first polyolefin;
   (C) adding about 0.1 to about 10 wt. % of a silane-crosslinking agent to the second polyolefin, thereby producing a substantially-miscible, polyolefin-based, silane-crosslinking-agent carrier;
   (D) melt blending the first polyolefin and the substantially-miscible, polyolefin-based, silane-crosslinking-agent carrier, thereby yielding a moisture-crosslinkable polyolefin-based composition; and
   (E) crosslinking the moisture-crosslinkable polyolefin-based composition.

2. The method of claim 1, wherein the first polyolefin is a peroxide-modified polyolefin.

3. The method of claim 2, wherein the peroxide-modified polyolefin is a peroxide-modified, Ziegler-Natta-catalyzed polyethylene.

4. The method of claim 3, wherein the peroxide-modified polyolefin is a peroxide-modified, Ziegler-Natta-catalyzed linear low density polyethylene.

5. The method of claim 1, wherein the first polyolefin is a pelletized polyolefin.

6. The method of claim 5, wherein the pelletized polyolefin is selected from the group consisting of polyethylene and polypropylene.

7. The method of claim 1, wherein the second polyolefin is selected from the group consisting of polyethylene and polypropylene.

8. The method of claim 1, wherein the second polyolefin is a powder selected from the group consisting of high density polyethylene (HDPE), low density polyethylene (LDPE), and linear low density polyethylene (LLDPE).

9. The method of claim 1, wherein the second polyolefin is a substantially spherical polypropylene reactor sphere.

10. The method of claim 1, wherein the silane-crosslinking agent comprises
    (i) a silane,
    (ii) a peroxide,
    (iii) optionally, a catalyst, and
    (iv) optionally, additives.

11. The method of claim 10, wherein the silane is a trialkoxyvinyl silane.

12. The method of claim 10, wherein the peroxide is dicumyl peroxide.

13. The method of claim 10, wherein the catalyst is selected from the group consisting of dibutyl tin dilaurate and a sulfonic acid catalyst.

14. The method of claim 10, wherein the additives comprise tetramethyl orthosilicate.

* * * * *